Jan. 8, 1946.  L. F. BERG  2,392,796
ELECTRIC OVEN
Filed March 23, 1943  2 Sheets-Sheet 1

Inventor:
Leo F. Berg,
by Harry E. Dunham
His Attorney.

Jan. 8, 1946.   L. F. BERG   2,392,796
ELECTRIC OVEN
Filed March 23, 1943   2 Sheets-Sheet 2

Inventor:
Leo F. Berg,
by Harry E. Dunham
His Attorney.

Patented Jan. 8, 1946

2,392,796

UNITED STATES PATENT OFFICE 2,392,796

ELECTRIC OVEN

Leo F. Berg, Oak Park, Ill., assignor to Edison General Electric Appliance Company, Inc., Chicago, Ill., a corporation of New York Application March 23, 1943, Serial No. 480,153

1 Claim. (Cl. 219—35)

This invention relates to electric ovens, more particularly to those used in electric ranges, and it has for its object the provision of an improved device of this character which is provided with external heating means.

It is of advantage to provide an electric oven with heating means located externally of the baking space in that it simplifies the cleaning of the oven because it is not necessary to remove the heating unit in order to gain access to the walls of the oven, and it permits the use of smooth substantially unbroken plane surface walls which are easy to clean; moreover, it removes danger of electric shock; and it permits the use of a smaller oven to give equivalent usable volume, or the usable volume of an oven of given size is increased.

This invention contemplates the provision of an improved oven and external heating unit organization of the aforementioned character, wherein the heating unit is easily applied to and removed from its operative position; and is applied to and removed at the front of the range, and also is arranged to be serviced from the front of the range. In addition, it contemplates the provision of an improved external heating unit which when in operative position completes the oven structure, including means for insulating the oven walls.

Figure 1:
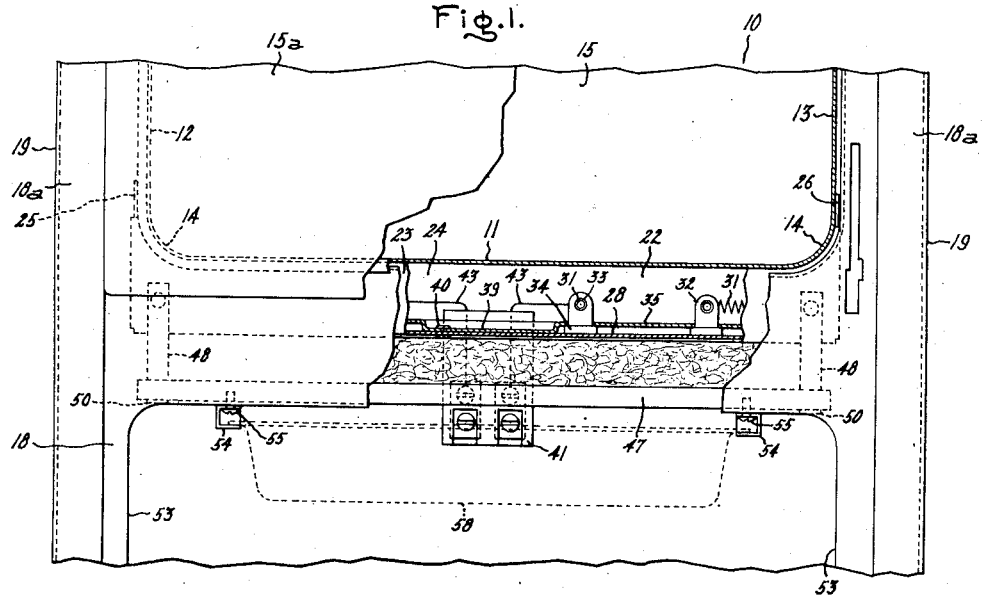
Figure 2:
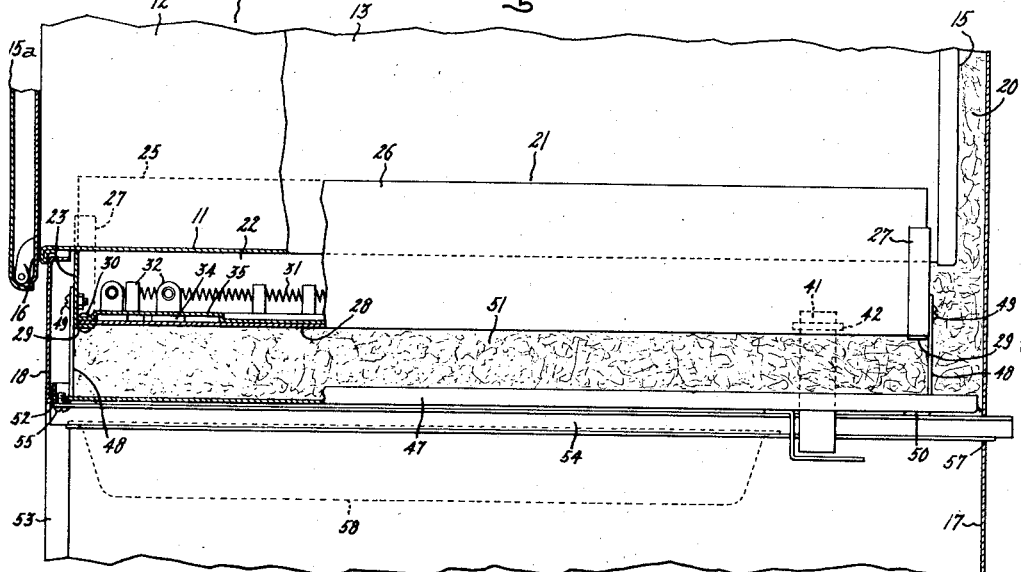
Figure 5:
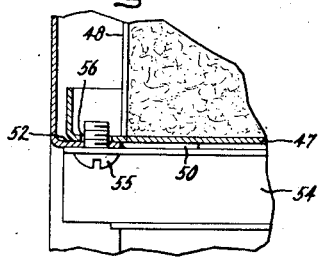
Figure 3:
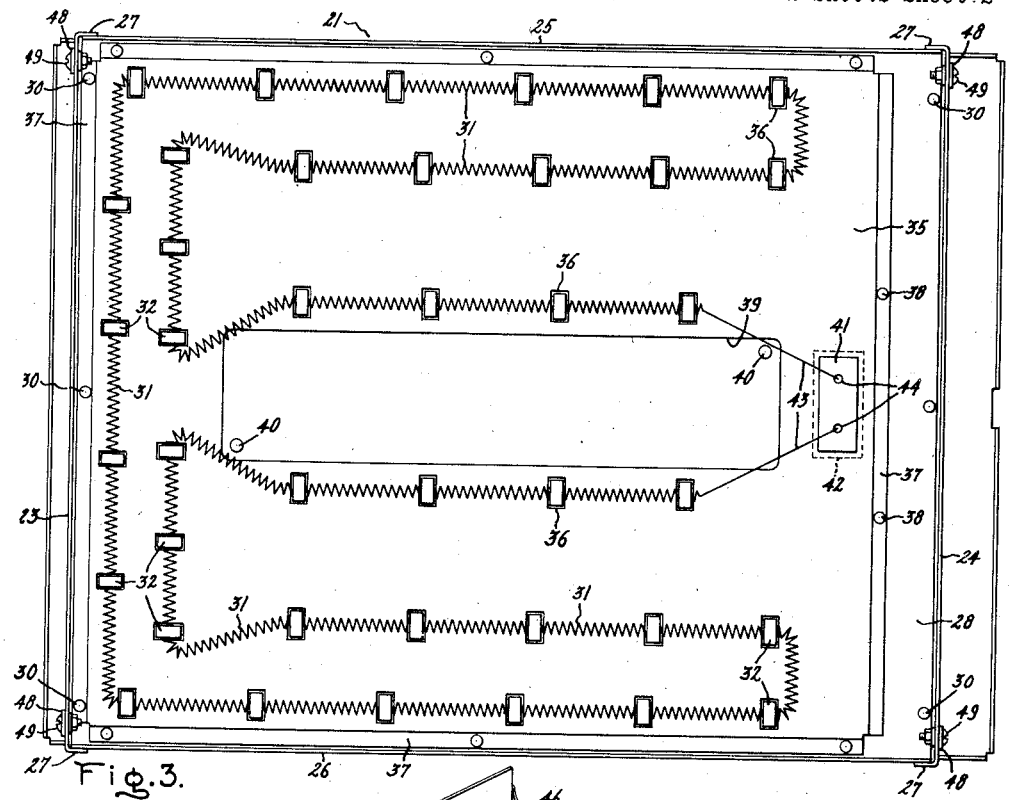
Figure 4:
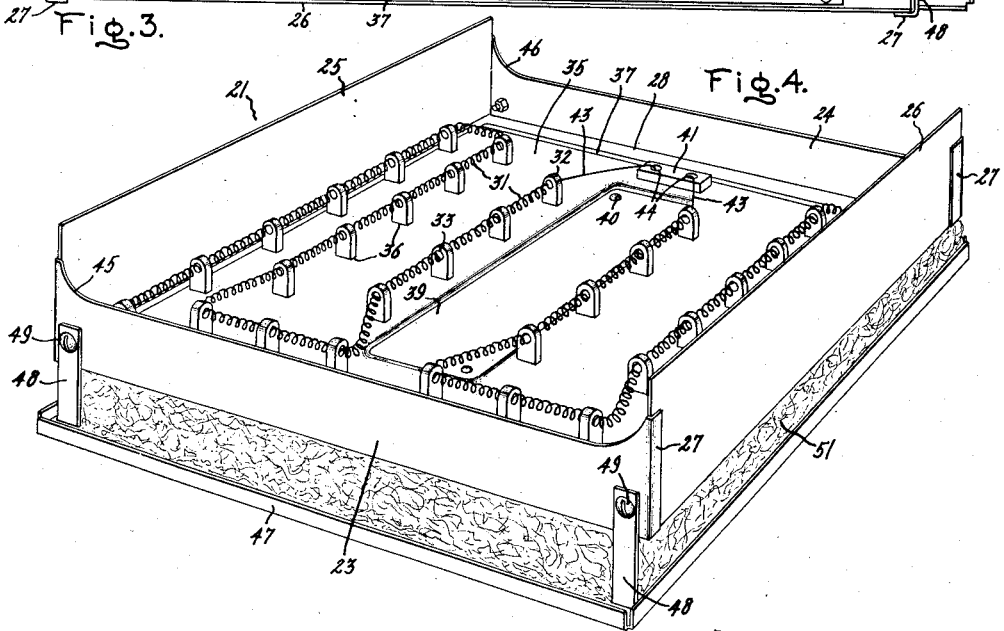

For a more complete understanding of this invention, reference should be had to the accompanying drawings in which Fig. 1 is a fragmentary front elevation of an electric range provided with an oven structure embodying this invention, parts being broken away and shown in section so as to illustrate certain details of construction; Fig. 2 is a vertical sectional view taken through a portion of the electric oven of Fig. 1; Fig. 3 is a plan view of a heating unit used in the electric oven of Figs. 1 and 2; Fig. 4 is a perspective view of the heating unit shown in Fig. 3; and Fig. 5 is a fragmentary view in section illustrating a portion of the oven shown in Fig. 2, Fig. 5 being drawn to a larger scale than Figs. 1 and 2.

Referring to the drawings, this invention has been shown in one form as applied to the oven structure of an electric range. As shown, the oven structure comprises an oven heating chamber 10 which preferably will be of rectangular shape in cross-section, the heating chamber being provided with a bottom wall 11, spaced side walls 12 and 13, and a top wall (not shown) opposite the bottom wall 11. Preferably, all of these walls will be integrally united, and as shown the walls are connected together by rounded corners 14. The heating space 10 is closed at the rear by means of a rear wall 15, and is open at the front; the front opening is closed by means of a door 15a which is mounted on hinges 16 to swing from a vertical closed position down to a horizontal open position.

The walls defining the heating chamber 10 are mounted in a base and casing structure including a rear wall 17 and a front wall 18. It will be observed that the rear wall 17 is spaced from the rear wall 15 of the heating chamber. It is to be understood that the casing structure further includes side walls 19 extending rearwardly from the front panel sections 18a of the front wall 18, and which walls are in spaced relation with reference to the side walls 12 and 13 of the heating chamber. Furthermore, it will be understood that the oven will be covered at the top by means of a top wall (not shown) which will be spaced from the top wall of the heating space 10.

It is believed to be unnecessary to describe in further detail the specific arrangement of the side walls 19 and the spaced top wall construction of the oven since these members may be of conventional form. It is to be pointed out, however, that the spaces between the side walls 12 and 13 and the side walls 19, between the rear wall 15 and the rear wall 17 and between the top wall of the heating chamber 10 and its spaced top wall, all will be completely filled with a mass of heat insulating material 20, which may be any suitable material, but preferably will be fibrous such as asbestos or glass wool.

The mass 20, however, does not cover the bottom wall 11 of the oven, but it leaves an open space, and in this open space there is inserted an electrical heating unit 21 arranged in accordance with this invention. The heating unit 21 comprises a rectangular pan-like chamber 22 which is defined by front and rear walls 23 and 24, and side walls 25 and 26. The front and rear walls 23 and 24 are provided with flanges 27 which overlap the ends of the two side walls 25 and 26 and which are secured to the side walls in any suitable way, as by welding. The pan 22 is completed at the bottom by means of a flat bottom wall 28 (Figs. 1 and 2) which is mounted upon inturned flanges 29 on the front and rear walls 23 and 24, and it is secured in these flanges in any suitable way, as by means of rivets 30, as shown more clearly in Fig. 3.

Mounted within the pan-like section 22 is a helical resistance conductor 31 which is formed into convolutions, as shown, and which is supported by means of a plurality of spaced insulators 32 provided with apertures 33 through which the resistance conductor is threaded. These insulators 32 are provided with bases 34 (Figs. 1 and 2) which rest upon the bottom wall 28 and which are clamped to the bottom wall by means of a clamping plate 35. The plate 35 is provided with a series of openings 36 which correspond to the positions of the insulators, and through which the top sections of the insulators are inserted. At its peripheral edges the plate 35 is provided with a depressed flange 37 which is secured to the bottom wall 28 by means of rivets 38. Also the central section 39 of the clamping plate 35 is depressed, as shown, and here also rivets 40 are provided for securing the central part to the bottom part of the plate 28.

At the rear portion of the heating unit there is provided an insulating terminal block 41 which has an outwardly projecting flange 42 adjacent its upper end and which flange also is clamped between the clamping plate 35 and the bottom plate 28. The terminal ends 43 of the resistance conductor are directed downwardly through spaced apertures 44 provided in the terminal block so as to extend down below the bottom of the heating unit where suitable electrical connections can be made with the supply source.

The heating unit 21 is adapted to be applied to the bottom wall 11 of the oven, as shown in Figs. 1 and 2. In order to accommodate it to the bottom wall, the ends of the edges applied to the front and rear walls 23 and 24 are provided with curved sections 45 and 46 respectively to fit the curved corners 14, as clearly shown in Fig. 1; and the side walls 25 and 26 are elevated above the front and rear walls so as to fit closely to the side walls 12 and 13 of the oven space. In this way, the pan 22 and the walls of the oven define a completely enclosed space for the resistance conductor 31.

When the heating unit 21 is in place, it is desirable to insulate its bottom wall and to cause its insulating medium to unite with the insulating layers 20 to form a complete enclosing blanket of insulating material about the oven walls and about the pan 22 which houses the resistance conductor 31. For this purpose, the heating unit itself supports its insulating medium. As shown, a rectangular, shallow, pan-like member 47 is mounted below the bottom wall 28 of the heating unit in spaced relation with it and secured with the heating unit by means of relatively small brackets 48 positioned at the four corners of the heating unit. These brackets 48 at their upper ends are secured to the front and rear walls 23 and 24 by means of screws 49, and their lower ends are inserted through apertures provided for them in the bottom wall of the pan 47, and the projecting ends 50 (Figs. 1, 2 and 5) are bent over and secured to the bottom wall of the pan in any suitable way, as by welding. These columns or brackets 48 constitute a relatively light, open-work framework connecting together the pan 22 and the pan 47.

Mounted within the space between the bottom wall 28 of the pan 22 and the bottom wall of the pan 47 is a mass 51 of thermally insulating material, which preferably will be of the same character as the insulating material 20. When the heating unit is inserted in its operative position against the bottom wall 11 of the oven, as shown in Figs. 1 and 2, the insulating mass 51 joins with the insulating mass 20 to form a complete blanket of insulating material around the oven side walls, its top wall and its rear wall, and also around and about the pan-like casing 22 housing the heating element, as clearly shown in Figs. 1 and 2.

The heating unit 21 is supported at the front by means of a flange 52 which extends inwardly from the front wall 18 of the base structure into an opening 53 provided in this front wall. This opening 53 constitutes an opening for a storage or warming drawer (not shown) which is of conventional form and which usually is found in electric ranges under the oven. Its flange 52 forms a convenient means for mounting the front end of the heating unit. The heating unit is supported at the rear by means of a pair of spaced-apart beams 54 extending from the front to the rear of the range, and which are secured at the front to the bottom surface of the inturned flange 52 by means of screws 55. These screws 55 are long enough to extend upwardly through clearance openings 56 provided for them in the bottom wall of the pan 47 in order to restrict movement of the heating unit at the front end. The beams are supported at the rear by being projected through openings 57 provided for them in the rear wall 17 of the base structure.

It will be understood that in assembling the heating unit 21 with its oven, it will be held in a substantially horizontal position, will be inserted through the front drawer opening 53, and then it will be pushed upwardly so that its front portion is brought over the flange 52. It then will be forced upwardly so that all parts of the heating unit are in their proper operative positions with reference to the oven. After this, the beams 54 are inserted through the drawer opening 53, and their rear ends are inserted through the openings 57 provided for them in the rear wall 17. Then the front sections of the beams are secured to the flange 52 by means of the screws 55. In order to remove the heating unit, it is merely necessary to unscrew screws 55 and withdraw the beams 54 through the drawer opening. This releases the unit which may then be withdrawn from the oven and through the drawer opening.

The supporting beams 54 also may be utilized to store the range broiler pan 58, as shown in Figs. 1 and 2.

It will be observed that in Fig. 2 there is a small space shown between the bottom surface of the lower pan 47 and the top surfaces of the beams 54. This space has been left for the purpose of clearly illustrating the construction and relationship of certain of the elements of the oven structure, but it is to be understood that the rear end of the pan 47 will rest upon the beams.

While I have shown and described a particular embodiment of my invention, it will be understood, of course, that I do not wish to be limited thereto since many modifications may be made, and I, therefore, contemplate by the appended claim to cover any such modifications as fall within the true spirit and scope of my invention.

What I claim as new and desire to secure by Letters Patent of the United States is:

In an oven structure, walls forming a heating chamber, supporting structure for said heating chamber including a rear wall and a front wall, an opening in said front wall, a flange on said front wall extending into said opening, a detachable heating unit insertable through said opening for application to the bottom of said oven, the front end of said unit being adapted to rest on said flange, and supporting beams for said heating unit detachably secured at the front to the under-side of said flange and having their rear ends projected through apertures provided for them in said rear wall, whereby they are held in their supporting positions.

LEO F. BERG.